May 7, 1929.  H. R. STAMBAUGH  1,712,056
AUTOMATIC SHUT-OFF VALVE
Filed Aug. 21, 1926  2 Sheets-Sheet 1

INVENTOR.
Harry R. Stambaugh
BY
Watson E. Coleman ATTORNEY.

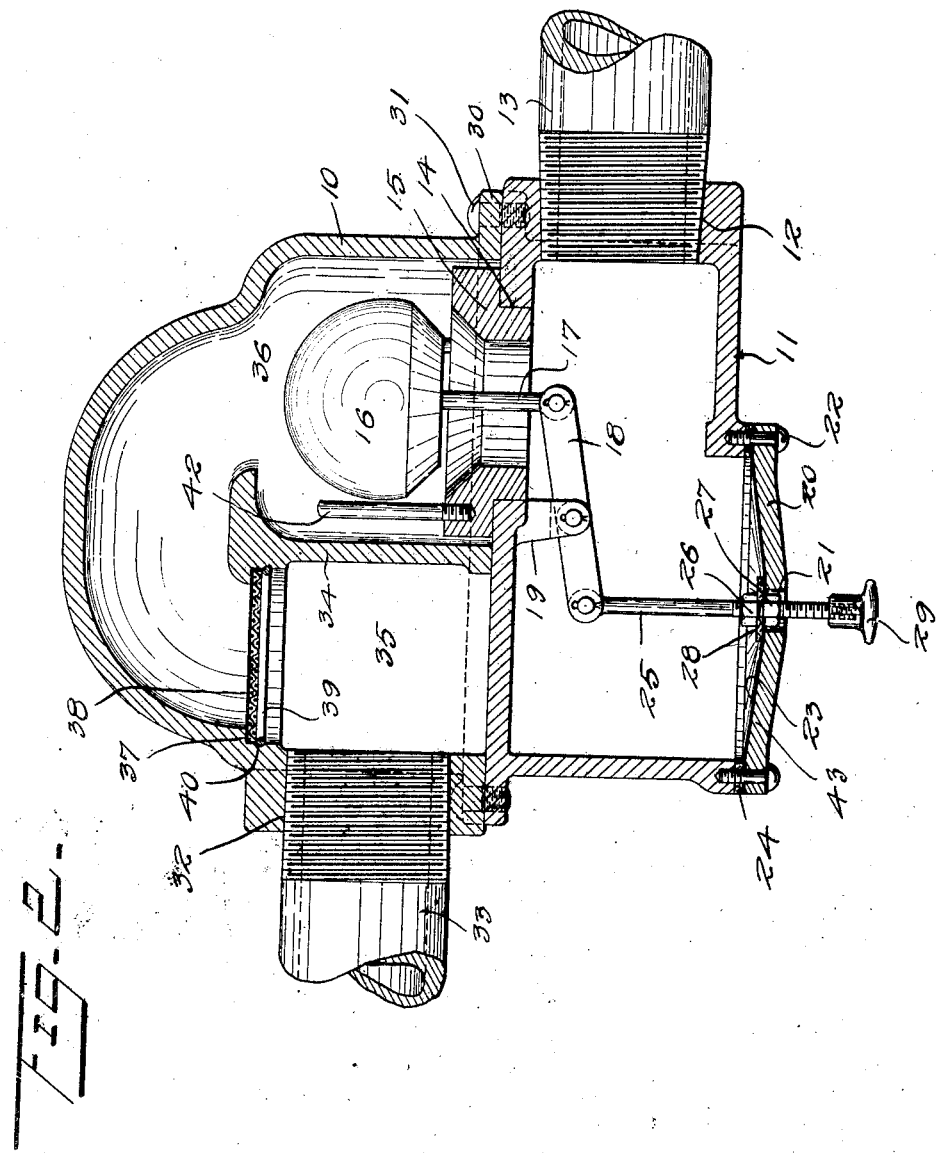

Patented May 7, 1929.

UNITED STATES PATENT OFFICE.

1,712,056

HARRY R. STAMBAUGH, OF FOSTORIA, OHIO, ASSIGNOR OF ONE-HALF TO WILBERT H. RINEBOLD, OF FOSTORIA, OHIO.

AUTOMATIC SHUT-OFF VALVE.

Application filed August 21, 1926. Serial No. 130,714.

This invention relates to automatic shut-off valves for use with gas or fluid pressure lines.

An important object of the invention is to produce a device of this character which may be very readily cleaned and which may be readily and cheaply produced.

A still further object of the invention is to produce a device of this character which will be durable and efficient in service and a general improvement in the art.

A further and important object of the invention is to provide a device of this character automatically cutting off the supply of fluid when the pressure of the fluid drops below a predetermined point, this device being so constructed that if any attempt is made to open the valve before the fluid pressure has increased to the proper point, the valve will immediately reclose. Such a device is principally intended for use in preventing disasters occasioned by dropping of gas pressure to such a low point that the burners employing the gas will go out and if unnoticed will be left with their cocks open so that when the pressure increases, gas will flow from the burners.

Other objects and advantages will become apparent throughout the course of the following description.

My invention is illustrated in the accompanying drawings, wherein:

Figure 2 is a similar view showing the valve in the open position.

Figure 1:
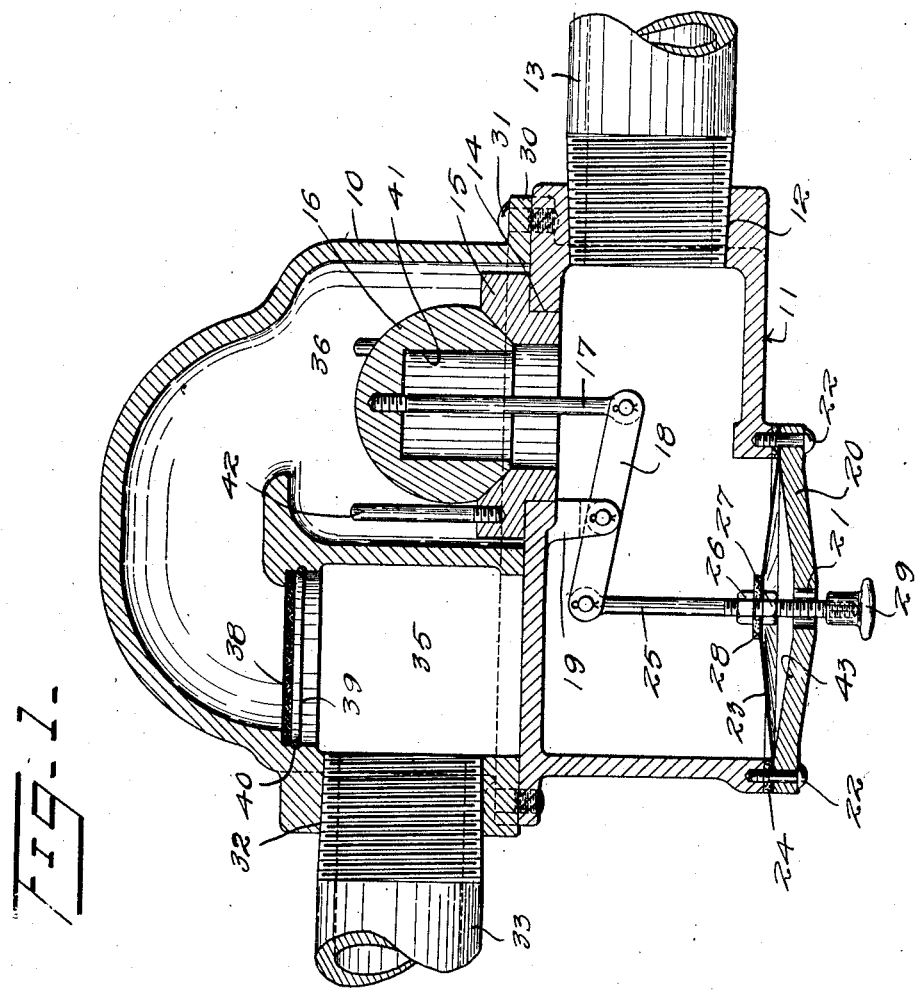
Figure 1 is a longitudinal sectional view through a valve constructed in accordance with my invention, showing the valve in the closed position.

Referring now more particularly to the drawings, the valve includes a casing formed in two sections 10 and 11. The section 11 is in the form of a drum having an opening 12 in its side wall for the reception of an exhaust pipe 13, while in its upper wall, it is formed with an opening 14 in which is engaged a valve seat 15 for a cut-off valve 16. This cut-off valve has its stem 17 engaged with one end of a lever 18 pivoted in a bracket 19 depending from the upper wall of the section 11. The lower wall of the section 11 has an opening closed by a removable plate 20, this plate having at its axial center an opening 21. The plate, together with its securing means 22, serves as a means for securing in position a flexible diaphragm 23 and a washer 24 for this diaphragm. Connected to the opposite end of the lever 18 is a rod 25 which passes centrally through the diaphragm 23 and through the opening 21 of the plate 20. Adjustable upon this stem are nuts 26 and 27 arranged at opposite sides of the diaphragm 23 and between one of these nuts and the diaphragm a washer 28 is disposed. The outer end of the rod 25 is provided with a suitable head 29 for engagement by the fingers.

The casing section 10 seats upon the upper surface of the casing section 11 and is provided about its edges with an out-turned flange 30 through which extend securing elements 31 for engagement with the casing section 11. In the side wall of the section 10 a port 32 is formed for engagement with an inlet pipe 33, this port being preferably so formed that when the sections are in assembled relation, the ports 12 and 32 are at opposite sides of the valve. Within the casing section 10 a partition wall 34 is arranged, this wall extending in the assembled position of the sections from the upper surface of the section 11 to a point adjacent to but spaced from the upper wall of the section 10. This provides in the section 10 compartments 35 and 36, the compartment 36 housing the valve 16 while the compartment 35 has opening thereinto the inlet pipe 33. The upper end of the compartment 35 is reduced to produce a shoulder 37 against which is seated a screen 38 held in position by an expansible ring 39 seated in a groove 40 formed in the wall of the compartment.

In the construction of the valve 16, this valve is made of desired weight, preferably obtained by counterboring the valve, as indicated at 41, so that the weight of the valve 16 is just sufficient to cause closing of the valve by gravity against the weight of the diaphragm and rod 25 when a predetermined low pressure is present within the chamber 11. When the valve is arranged in the gas feed line, gas entering the compartment 35 must pass upwardly through the screen 37 with the result that dirt or foreign substances carried by the gas are removed therefrom and retained within the compartment 35. From this compartment, they may be readily removed by separating the sections of the casing and without disconnecting the conduits 13 and 33. When it is desired to provide a flow of gas through the conduit 13, the rod 25 is pulled downwardly by the operating handle 29 with the result that the valve 16 is raised from its seat. In its raised position, this valve is guided by vertically extending pins 42 threaded at their lower ends into the seat 15 so that the valve is at all times maintained in proper alignment with its seat. When the pressure of the gas is sufficient, the diaphragm 23 which, by downward movement of the rod 25, has been moved into engagement with the concave inner face 43 of the plate 20, is held in engagement with this plate and the valve is held in its elevated position. If, however, the pressure is insufficient, the valve will again drop to its seat, cutting off the supply of gas to the conduit 13. The pressure of the gas will act to more firmly seat the valve and thus to prevent any leakage between the valve and seat.

Since the construction hereinbefore set forth is capable of a certain range of change and modification without materially departing from the spirit of the invention, I do not limit myself to such specific structure except as hereinafter claimed.

I claim:—

An automatic shut-off valve including a casing formed of an upper and a lower section, the lower section being in the form of a drum, against a side face of which the other section is seated, the last named section having a vertical partition sub-dividing the section into two communicating compartments, the lower end of the partition abutting against the adjacent side face of the drum, an intake communicating with one of said compartments, said last named compartment at its inner end being formed to provide a seat, a screen detachably disposed upon said seat, a removable valve seat carried by the wall of the drum at the lower end of the other compartment, a valve disposed within said upper section and abutting said seat, and a lever pivoted within the drum, to one end of which the valve is linked, a rod connected to the opposite end of the lever and projected through the wall of the drum to provide means for shifting the lever, and a diaphragm connected to said rod and subjected to the pressure within the drum for shifting the rod in a direction to open the valve, said drum having an outlet.

In testimony whereof I hereunto affix my signature.

HARRY R. STAMBAUGH.